W. H. SNYDER.
ANTISKIDDING DEVICE FOR VEHICLE WHEELS.
APPLICATION FILED OCT. 28, 1912.
1,073,446.
Patented Sept. 16, 1913.
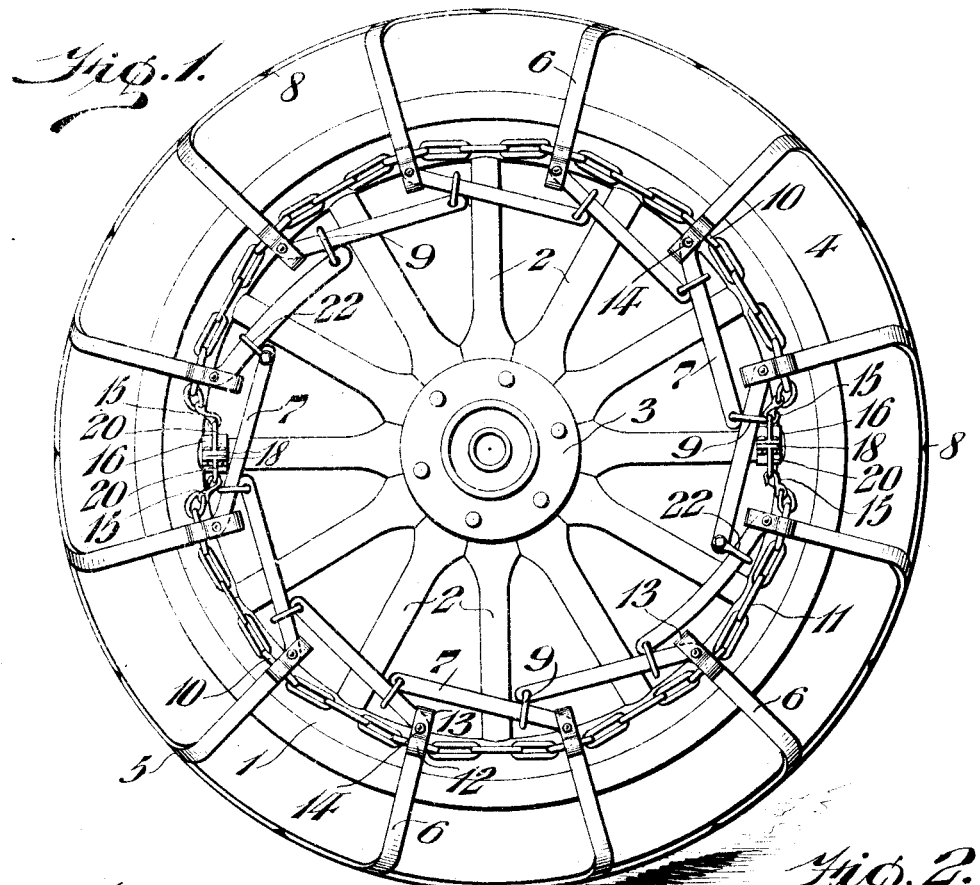
WITNESSES
INVENTOR
William H. Snyder
ATTORNEYS

UNITED STATES PATENT OFFICE.

WILLIAM H. SNYDER, OF ASHBOURNE, PENNSYLVANIA, ASSIGNOR OF ONE-FOURTH TO LOUIS C. BLOCK, ONE-FOURTH TO FORMAN POOLE HOLLINSHEAD, AND ONE-FOURTH TO WILLIAM ROSS WALTON, ALL OF ELKINS PARK, PENNSYLVANIA.

ANTISKIDDING DEVICE FOR VEHICLE-WHEELS.

1,073,446.     Specification of Letters Patent.    Patented Sept. 16, 1913.

Application filed October 28, 1912. Serial No. 728,172.

*To all whom it may concern:*

Be it known that I, WILLIAM H. SNYDER, a citizen of the United States, and resident of Ashbourne, in the county of Montgomery, State of Pennsylvania, have invented a new and useful Antiskidding Device for Vehicle-Wheels, of which the following is a specification.

My invention consists of a detachable anti-skidding device for vehicle-wheels in which the strain upon one grip is transmitted to all of the grips around the wheel.

It further consists of such device in which the grip-members are connected in a plurality of sets which are separately attached to the wheel.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

In said annexed drawings—Figure 1 represents a side view of a wheel provided with my improved anti-skidding device. Fig. 2 represents a view from the tread-side of one of the grips. Fig. 3 represents an edge-view of a grip. Fig. 4 represents a sectional detail view of one of the clips securing the grips to the chain. Fig. 5 represents a view of one of the clips securing the ends of the chains to the spokes,—the spoke being shown in section.

Similar numerals of reference indicate corresponding parts in the figures.

Referring to the drawings, the reference numeral 1 indicates the rim or felly of a wheel having spokes, 2, and a hub, 3, and tire, 4, all of which parts may be of any desired or required construction. The grips are preferably formed from flat metallic strips, which are bent to form tread-portions, 5, side-arms, 6, which are adapted to bear against the sides of the tire and felly, and lever-arms, 7, forming obtuse angles to the side-arms. The grips are preferably so formed that, when they are placed in operative position on the wheel, they will extend obliquely across the tread of the tire. When the device is intended to be used upon a double tire or upon a tire having two rows of blocks, the tread-portion is formed at its middle with a bend or depression, 8, which will fit in the space between the two parts or two rows of blocks of the tire. Links, 9, are pivoted in the ends of the lever-arms of the grips, and the lever-arm of each link passes through a link upon the end of the lever-arm of the next adjoining grip. The lever-arms of the grips are inserted through links, 10, of chains, 11, and the sides of such links are clamped by curved jaws, 12, of clips, 13, secured at the bends of the grips by bolts, 14. The chains are preferably composed of a plurality of sections,—two being shown in the drawings,—having snap-hooks, 15, or similar detachable fastenings at their ends. Two-part clips, 16, are secured upon the spokes at the points where the ends of the chain-sections meet,—in the present instance to two diametrically opposed spokes,—and said clips are formed with socket-portions, 17, which embrace the spoke and have laterally projecting flanges, 18, through which pass nutted screw-bolts, 19, serving to draw the two parts of the clip together to clamp the latter upon the spoke. The clip-parts have each a circumferentially extending flange, 20, formed with holes, 21, near its periphery and at varying distances from the socket-portion, which holes may be engaged by the snap-hooks. The links, 22, upon the lever-arms of the grip at one end of each section are separable or otherwise detachable from said arms, so that they may be disconnected from the lever-arms of the adjoining grips when removing the sections and be connected when placing the same.

In practice, a section is placed upon the upper portion of the wheel with the grips straddling the tire, and the snap-hooks at the ends of the chain-section are hooked in the holes of the clips upon the spokes. Such holes being at varying distances from the spoke-sockets, the chains may be tightened in accordance with the peripheral dimension of the wheel. The wheel is now revolved, preferably by moving the vehicle, until another portion of its periphery is uppermost, when the second section can be put in place and secured to the clips upon the spokes, whereupon the detachable links at one end of each section are slipped around their corresponding lever-arms and pivotally secured in the ends of the adjoining lever-arms, to make the structure peripherally continuous.

The transverse obliquity of the tread-portions is preferably at such angle to the sides of the tread of the wheel, that in traveling over the ground, one tread-portion engages the ground before the adjoining tread-portion leaves it, so that the strain will be divided between two grips. The bearing strain upon the grips will be distributed around the wheel to all of the grips and upon their bearings upon the tire, by the lever-arms and links, each grip transmitting any tilting movement caused by engagement with the ground to the next adjoining strip through the lever-arms and links, whence such strain and movement is transmitted to the next grip, and so forth, all around the wheel.

The provision of a series of holes in the flanges of the clips upon the spokes, at different distances from the spokes, not only admit of the sections being tightened upon the wheel as its tire or tread wears out, but also admits of one end of each section being drawn in one direction and let out at the opposite end, so that the grips may be adjusted to bear against different parts of the tire each time the device is applied, to prevent uneven wear of the tire by having the grips continually bear against the same places on the tire.

The device may be applied to the wheel without the need of jacking-up the wheel from the ground, as each section may be applied and the wheel turned to apply the next by moving the vehicle in either direction. It is evident that the number of sections may be more than the two sections illustrated, according to desire or requirements, such as according to the peripheral dimensions of the wheel.

The grips with their transversely oblique tread-portions are prevented from skewing or other displacement caused by the grips striking obstructions, by the side-arms and lever-arms of the grips bearing against the sides of the rim and tire of the wheel.

Other modes of applying the principle of my invention may be employed for the mode herein explained. Change may therefore be made as regards the mechanism thus disclosed, provided the principles of construction set forth respectively in the following claims are employed.

Having thus described my invention, what I claim as new and desire to secure by Letters Patent, is:—

1. In a device of the character stated, a series of grips having tread-portions and side-arms and lever-arms at an angle to such side-arms and adapted to encompass the tire and rim of a wheel, and links pivotally secured in said lever-arms and each engaging a lever-arm of the next adjoining grip at a point beyond the side-arms thereof in the direction of the first mentioned lever-arms.

2. In a device of the character stated, a series of grips having tread-portions and side-arms and lever-arms at an angle to such side-arms and adapted to encompass the tire and rim of a wheel, and movable connections between each lever-arm and the lever-arm of the next-adjoining grip at a point beyond the side-arms of the latter in the direction of said first mentioned lever-arms.

3. In a device of the character stated, a series of grips, each comprising a tread portion, side-arms and lever-arms at an angle to said side-arms, and each grip adapted to encompass the tire and rim of a wheel, chains secured to said grips at the angles of the side-arms and lever-arms, and links movably secured to the ends of said lever-arms and each having a lever-arm of the next adjoining grip inserted through it.

4. In a device of the character stated, a series of grips adapted to encompass the tire and rim of a wheel, chain-sections having a plurality of said grips secured to them, clips adapted to be secured upon spokes of a wheel and having flanges formed with holes at different distances from the spoke, and detachable fastening means upon the ends of such chain-sections and adapted to engage the holes in the flanges of said clips.

5. In a device of the character stated, a series of grips having tread portions and side-arms and lever-arms at an angle to such side-arms and adapted to encompass the tire and rim of a wheel, and links movably connected with said lever-arms and each movably connected with a lever-arm of the next adjacent grip, at a point beyond the side-arms thereof in the direction of said first mentioned lever-arms.

6. In a device of the character stated, a series of grips having lever-arms, chains secured to said grips, and links movably secured adjacent the ends of said lever-arms and each having a lever-arm of the next adjacent grip slidably connected therewith.

7. In a device of the character stated, a series of grips formed with tread-portions and side-arms and lever-arms at an angle to such side-arms and adapted to encompass the periphery of a wheel, and connections between the lever-arms of each grip and the lever-arms of the next adjacent grip pivoted with respect to one arm and slidable with respect to the other.

8. In a device of the character stated, a series of grips formed with tread-portions and side-arms and lever-arms at an angle to such side-arms, and adapted to encompass the periphery of a wheel, and connections, between the lever-arms of each grip and the lever-arms of the next adjacent grip, pivoted with respect to one arm, and slidably connected with respect to the other, at a point beyond the side-arms thereof, in the direction of the first mentioned lever-arm.

9. In a device of the character stated, a series of grips formed of tread portions and side-arms and lever-arms at an angle to such side-arms, and adapted to encompass the periphery of a wheel, connections between the lever-arms of each grip and the lever-arms of the next adjacent grip, pivoted with respect to the one arm, and slidable with respect to the other, and a flexible connection securing the set of grips to the body of the wheel.

10. In a device of the character stated, a series of grips formed with tread-portions and side-arms and lever-arms at an angle to such side-arms, and adapted to encompass the periphery of a wheel, and connections movably secured with respect to the lever arms of a grip, and slidably connected with respect to an adjoining grip.

WILLIAM H. SNYDER.

Witnesses:
H. M. LAFFERTY,
C. D. McVAY.

Copies of this patent may be obtained for five cents each, by addressing the "Commissioner of Patents, Washington, D. C."